(12) United States Patent
Sung et al.

(10) Patent No.: US 11,084,379 B2
(45) Date of Patent: Aug. 10, 2021

(54) IN-VEHICLE FUNCTION CONTROL APPARATUS USING DETACHABLE KNOB AND METHOD OF CONTROLLING THE SAME

(71) Applicants: HYUNDAI MOTOR COMPANY, Seoul (KR); KIA MOTORS CORPORATION, Seoul (KR)

(72) Inventors: Si Hoon Sung, Hwaseong-si (KR); Jae Hoon Chung, Hwaseong-si (KR); Sung Un Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 13 days.

(21) Appl. No.: 16/689,635

(22) Filed: Nov. 20, 2019

(65) Prior Publication Data
US 2020/0189392 A1    Jun. 18, 2020

(30) Foreign Application Priority Data
Dec. 13, 2018    (KR) .................. 10-2018-0161237

(51) Int. Cl.
*G09G 1/00* (2006.01)
*B60K 37/06* (2006.01)
*H01F 7/20* (2006.01)
*H01F 7/02* (2006.01)
*G09G 5/373* (2006.01)
(Continued)

(52) U.S. Cl.
CPC .............. *B60K 37/06* (2013.01); *G09G 5/14* (2013.01); *G09G 5/373* (2013.01); *H01F 7/02* (2013.01); *H01F 7/20* (2013.01); *B60H 1/0065* (2013.01); *B60K 35/00* (2013.01); *B60K 2370/1434* (2019.05); *B60K 2370/164* (2019.05); *B60K 2370/166* (2019.05); *G06F 3/02* (2013.01);
(Continued)

(58) Field of Classification Search
None
See application file for complete search history.

(56) References Cited

U.S. PATENT DOCUMENTS

2015/0355731 A1* 12/2015 Tanaka .................... G06F 3/038
                                                     345/184
2018/0154774 A1*  6/2018 Park ...................... G06F 1/1654

FOREIGN PATENT DOCUMENTS

KR    10-1773766 B1    9/2017
KR    10-1844322 B1    4/2018

* cited by examiner

*Primary Examiner* — Michael A Faragalla
(74) *Attorney, Agent, or Firm* — McDonnell Boehnen Hulbert & Berghoff LLP

(57) ABSTRACT

A user interface capable of controlling various functions of a vehicle is disclosed. More particularly, an in-vehicle function control apparatus using a detachable knob and a method of controlling the same are disclosed. A method of controlling a vehicle function using a detachable knob includes an integrated operation unit detecting an attachment position of the detachable knob among a plurality of attachment positions in a vehicle, transmitting information on a result of the operation from the detachable knob to the integrated operation unit when an operation unit provided in the detachable knob is operated, and the integrated operation unit controlling a controlled function corresponding to the attachment position of the detachable knob based on the information on the result. The detachable knob is fixed at any one of the plurality of attachment positions using magnetic force.

15 Claims, 12 Drawing Sheets

(51) Int. Cl.
  *G09G 5/14* (2006.01)
  *B60K 35/00* (2006.01)
  *B60H 1/00* (2006.01)
  *G06F 3/02* (2006.01)
  *G06F 3/0354* (2013.01)
(52) U.S. Cl.
  CPC ..... *G06F 3/03547* (2013.01); *G09G 2354/00* (2013.01); *G09G 2380/10* (2013.01)

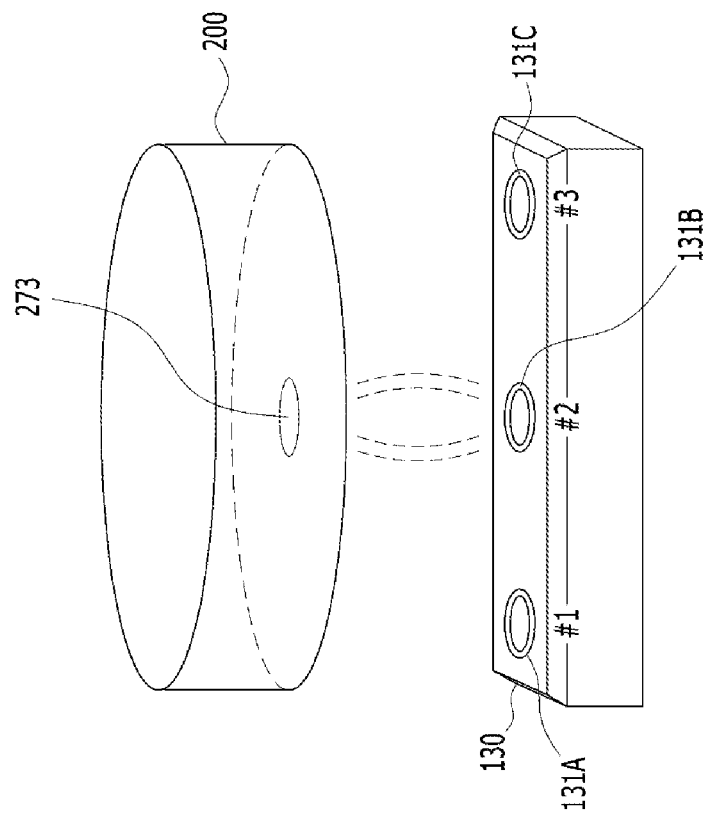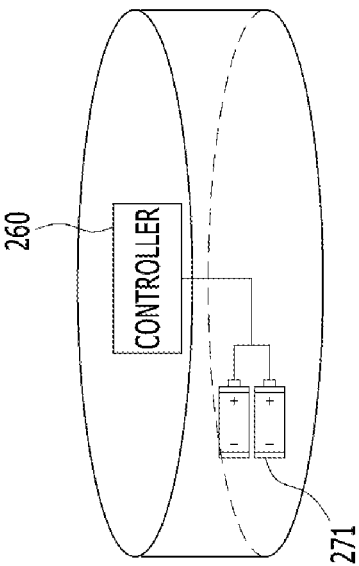

IN-VEHICLE FUNCTION CONTROL APPARATUS USING DETACHABLE KNOB AND METHOD OF CONTROLLING THE SAME

CROSS REFERENCE TO RELATED APPLICATION

This application claims the benefit of Korean Patent Application No. 10-2018-0161237, filed on Dec. 13, 2018, which is hereby incorporated by reference as if fully set forth herein.

BACKGROUND

Field of the Disclosure

The present disclosure relates to a user interface capable of controlling various functions of a vehicle and, more particularly, to an in-vehicle function control apparatus using a detachable knob and a method of controlling the same.

Discussion of the Related Art

Since vehicles released in recent years include various electronic apparatuses, the types and ranges of functions capable of being controlled by users have been diversified. Therefore, an operation system becomes complicated and the amount of information to be simultaneously displayed has also increased. Due to this tendency, the size of a display for displaying a vehicle operation state and multimedia or navigation information has gradually increased. In addition, in future autonomous vehicles, since a driver does not need to drive a vehicle, the driver is likely to watch content during a travel time. Accordingly, the size of the display provided in the vehicle may further increase.

In general, in control of a controlled function displayed on a display, a tree type menu structure based on an in-vehicle communication control processor (CCP) is used. Some vehicles provide a voice recognition function. However, the CCP based operation method is complicated due to a large number of operation steps (depth). Voice recognition has a relatively simple operation step but the usage rate thereof tends to remarkably decrease when a passenger is present.

Accordingly, there is a need for an in-vehicle function control apparatus capable of more intuitively using various functions of a display in preparation for increase in size of the display.

SUMMARY

Accordingly, the present disclosure is directed to an in-vehicle function control apparatus using a detachable knob and a method of controlling the same that substantially obviate one or more problems due to limitations and disadvantages of the related art.

An object of the present disclosure is to provide a more convenient in-vehicle function control apparatus and a method of controlling the same.

Another object of the present disclosure is to provide an in-vehicle apparatus capable of controlling various vehicle functions using a detachable knob, and a method of controlling the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an integrated operation unit detecting an attachment position of the detachable knob among a plurality of attachment positions in a vehicle, transmitting information on a result of the operation from the detachable knob to the integrated operation unit when an operation unit provided in the detachable knob is operated, and the integrated operation unit controlling a controlled function corresponding to the attachment position of the detachable knob based on the information on the result. The detachable knob is fixed at any one of the plurality of attachment positions using magnetic force.

In another aspect of the present disclosure, an in-vehicle function control apparatus using a detachable knob includes the detachable knob including an operation unit, and an integrated operation unit configured to detect an attachment position of the detachable knob among a plurality of attachment positions in a vehicle. When the operation unit is operated, the detachable knob transmits information on a result of the operation to the integrated operation unit, the integrated operation unit controls a controlled function corresponding to the attachment position of the detachable knob based on the information on the result, and the detachable knob is fixed at any one of the plurality of attachment positions using magnetic force.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 7A and 7B are views showing an example of the configuration of a power supply of a detachable knob according to an embodiment of the present disclosure;

DETAILED DESCRIPTION

Figure 1:
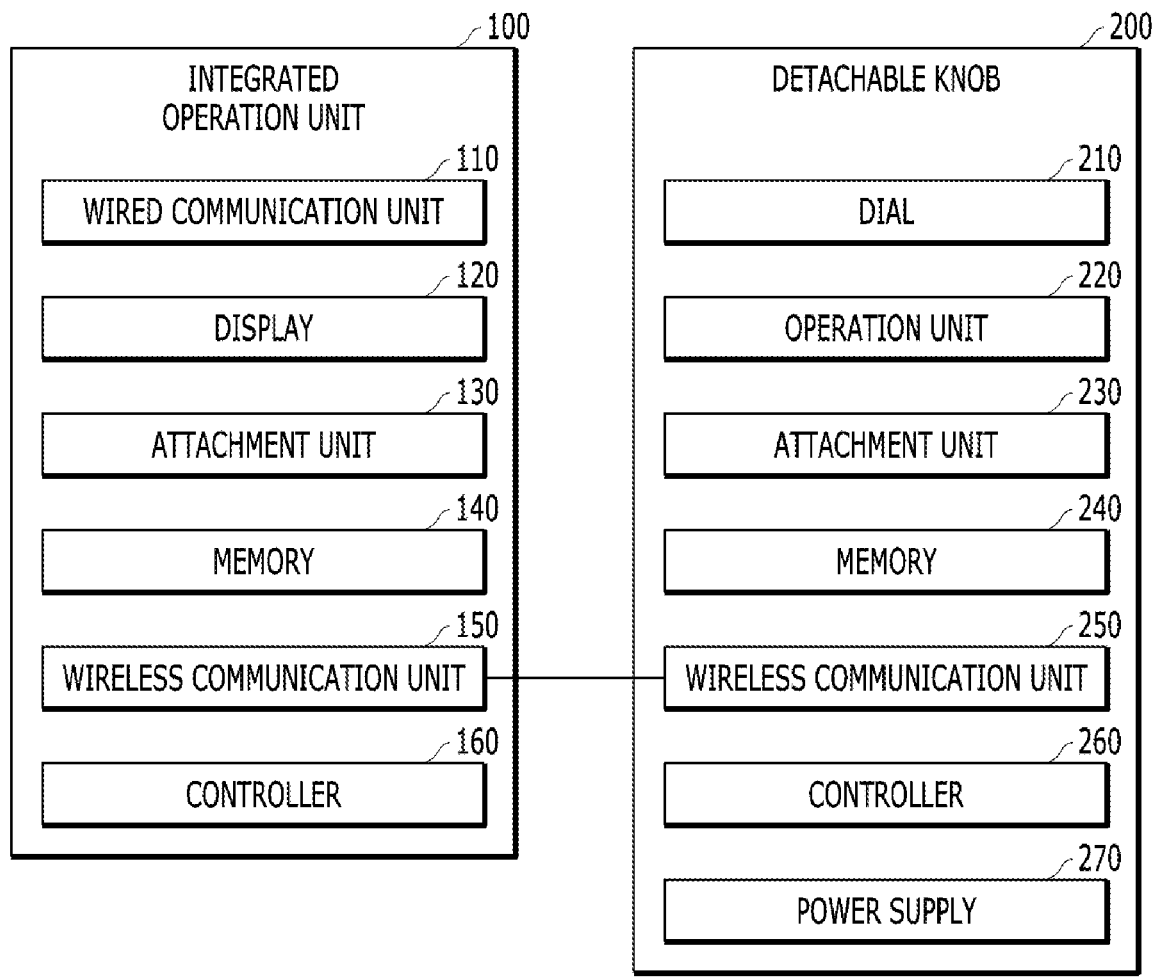
FIG. 1 is a diagram showing an example of the structure of an in-vehicle function control system including a detachable knob according to an embodiment of the present disclosure.

Hereinafter, the embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

In the entire specification, when a certain portion "includes" a certain component, this indicates that other components are not excluded, but may be further included unless specially described. The same reference numbers will be used throughout the drawings to refer to the same or like parts.

In one embodiment of the present disclosure, in vehicle function control, when a detachable knob provided with a display is attached at a predetermined point in a vehicle, various vehicle functions may be controlled.

First, the structure of an in-vehicle function control system including a detachable knob applicable to embodiments of the present disclosure will be described with reference to FIG. 1. FIG. 1 is a diagram showing an example of the structure of an in-vehicle function control system including a detachable knob according to an embodiment of the present disclosure.

Referring to FIG. 1, the in-vehicle function control system according to the embodiment may include an integrated operation unit 100 and a detachable knob 200.

The integrated operation unit 100 may include a wired communication unit 110, a display 120, an attachment unit 130, a memory 140, a wireless communication unit 150 and a controller 160. Hereinafter, these components will be described in detail.

The wired communication unit 110 may exchange data with a controller for controlling at least a plurality of controlled functions in the vehicle. For example, the wired communication unit 110 may support at least one of in-vehicle communication schemes such as CAN (controller area network), CAN-FD (CAN with flexible data rate), LIN (Local Interconnect Network) or Ethernet. In another example, the wired communication unit 110 may receive operation state information of an air conditioner controller for controlling an air conditioner, a body controller for controlling a convenience function such as a seat, an audio video navigation (AVN) system, etc. and transmit a control command.

The display 120 serves to visually output a vehicle operation state such as a navigation guidance screen, operation state information of an air conditioner system, or playback state information of a multimedia function or a variety of information necessary for a driver. If the display is a touchscreen, a virtual operation system for controlling at least some functions may be displayed and a touch command input to the virtual operation system may be detected.

The attachment unit 130 may detect whether the detachable knob 200 is detached. For example, the attachment unit 130 may include at least one of a Hall sensor for detecting magnetic force, a near field communication (NFC) transceiver for performing NFC, a wireless charging transmitter for detecting a wireless charging receiver, a light reception unit for recognizing a specific light emission pattern, and a capacitance sensor for sensing capacitance change. That is, the detachable knob 200 may be detected by the Hall sensor if the detachable knob 200 is provided with a permanent magnet, the detachable knob 200 may be detected by the NFC transceiver if the detachable knob 200 is provided with an NFC tag, and the detachable knob 200 may be detected through the wireless charging transmitter if the detachable knob 200 is provided with the wireless charging receiver. Of course, such a sensing unit is only an example and the present disclosure is not limited thereto. In addition, the attachment unit 130 may include an attachment portion for fixing the detachable knob 200 at one or more predetermined attachment positions. For example, the attachment portion may include a plurality of permanent magnets or electromagnets disposed to have a predetermined pattern. In this case, the detachable knob 200 may include at least permanent magnets to correspond to the configuration of the attachment unit 130. This will be described in greater detail with reference to FIGS. 3 to 5.

The memory 140 may store an operating system for driving the AVN system, various application programs operating on the operating system, multimedia content, input/output control information, etc.

The wireless communication unit 150 may be connected to at least the wireless communication unit 250 of the detachable knob 200 using a short-range communication protocol (e.g., Bluetooth, Wi-Fi, ZigBee, NFC, etc.), thereby performing data exchange. Of course, in some embodiments, the wireless communication unit 150 may communicate with another component inside the vehicle, such as an AVN system.

The controller 160 may perform overall control of the above-described components and perform determination and operation necessary to control the controlled function through interworking with the detachable knob 200 according to the embodiments of the present disclosure.

Meanwhile, the detachable knob 200 may include a dial (or a wheel) 210, an operation unit 220, an attachment unit 230, a memory 240, a wireless communication unit 250, a controller 260 and a power supply 270. The configurations of the dial 210 and the operation unit 220 will be described below with reference to FIG. 2 and the configuration of the attachment unit 230 will be described in greater detail with reference to FIGS. 3 to 6.

The memory 240 may store an operating system for driving the detachable knob 200, identification information of each controlled function, input/output control information of the detachable knob 200, etc.

The wireless communication unit 250 may be connected to at least the wireless communication unit 150 of the integrated operation unit 100 using a short-range communication protocol (e.g., Bluetooth, Wi-Fi, ZigBee, NFC, etc.) or a 3/4/5G protocol, thereby performing data exchange. Of course, the wireless communication unit 250 may be configured to communicate with a telematics server or another smart device (e.g., a smartphone, a tablet, etc.).

The controller 260 performs overall control of the above-described components and performs determination and operation necessary to control the controlled function through interworking with the integrated operation unit 100 according to the embodiments of the present disclosure.

Figure 2A:
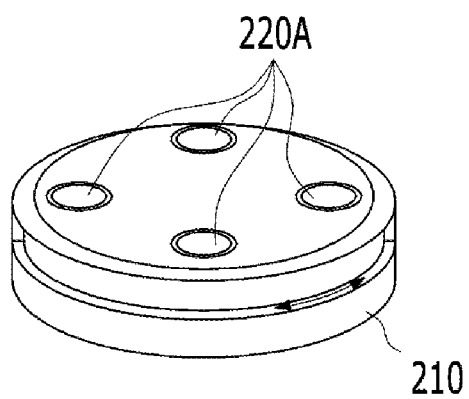
FIGS. 2A, 2B, and 2C are views illustrating the appearance of a detachable knob according to an embodiment of the present disclosure.
Figure 2B:
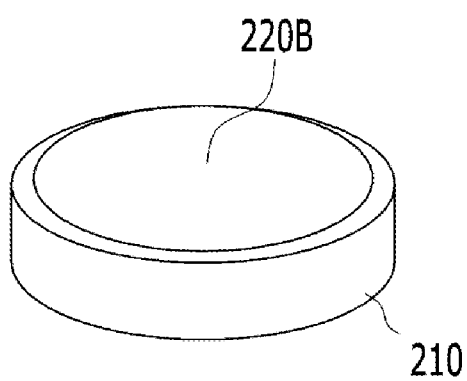
Figure 2C:
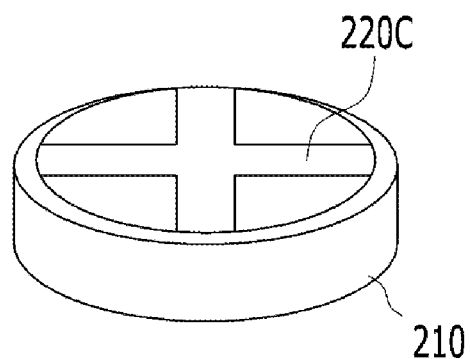

FIGS. 2A to 2C are views illustrating the appearance of a detachable knob according to an embodiment of the present disclosure.

Referring to FIGS. 2A to 2C, the detachable knob 200 according to the embodiment may have a cylindrical appearance. Specifically, the detachable knob 200 may have a toroidal or ring-shaped dial 210 surrounding a circular upper surface.

The dial 210 may be configured to rotate clockwise or counterclockwise along the outer circumference of the detachable knob 200, and may include a wheel encoder in which at least one of rotation direction and a degree of rotation (e.g., displacement or angle) may be detected when a user grabs and rotates the dial. Of course, this is an example and the present disclosure is not limited to a detailed unit or method for detecting rotation.

The operation unit 220 may be disposed on the upper surface of the detachable knob, and may include a plurality of key buttons 220A disposed to be spaced apart from each other in a predetermined pattern as shown in FIG. 2A, include a circular touch pad 220B occupying most of the upper surface as shown in FIG. 2B, or include a touch sensor 220C having a predetermined shape as shown in FIG. 2C. Here, the plurality of key buttons 220A may be push buttons or touch buttons. In addition, if the circular touch pad 220B is used as shown in FIG. 2B, a command may be input through handwriting recognition.

Next, the method of attaching the attachment unit 130 of the integrated operation unit 100 and the attachment unit 230 of the detachable knob 200 and the method of recognizing the attachment position will be described with reference to FIGS. 3 to 6C.

Figure 3:
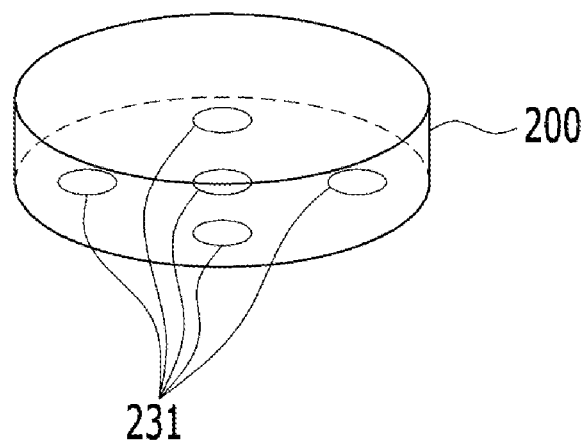
FIG. 3 is a view showing an example of the configuration of an attachment unit of a detachable knob according to an embodiment of the present disclosure.

FIG. 3 is a view showing an example of the configuration of an attachment unit of a detachable knob according to an embodiment of the present disclosure.

Referring to FIG. 3, the attachment unit 230 of the detachable knob 200 may include the attachment portions corresponding to the configuration of the attachment unit 130 of the integrated operation unit 100. Examples of the attachment portion include a plurality of magnetic materials 231 disposed on the lower surface (an outer lower surface or an inner lower surface) of the detachable knob 200 to have a predetermined pattern. The individual magnetic material may include iron, nickel, cobalt, a magnet or an alloy thereof, without being limited thereto. For example, in the operation unit 220A or 220C shown in FIG. 2A or FIG. 2C, as shown in FIG. 3, when the magnetic materials 231 are disposed at an interval of 90 degrees (that is, "+" pattern), since the detachable knob 200 rotates in units of 90 degrees, the operation unit 220A or 220C is substantially attached in a "+" shape. When the magnetic materials 231 of the detachable knob 200 are disposed in this manner, the attachment portion of the integrated operation unit 100 may be configured as shown in FIG. 4.

Figure 4:
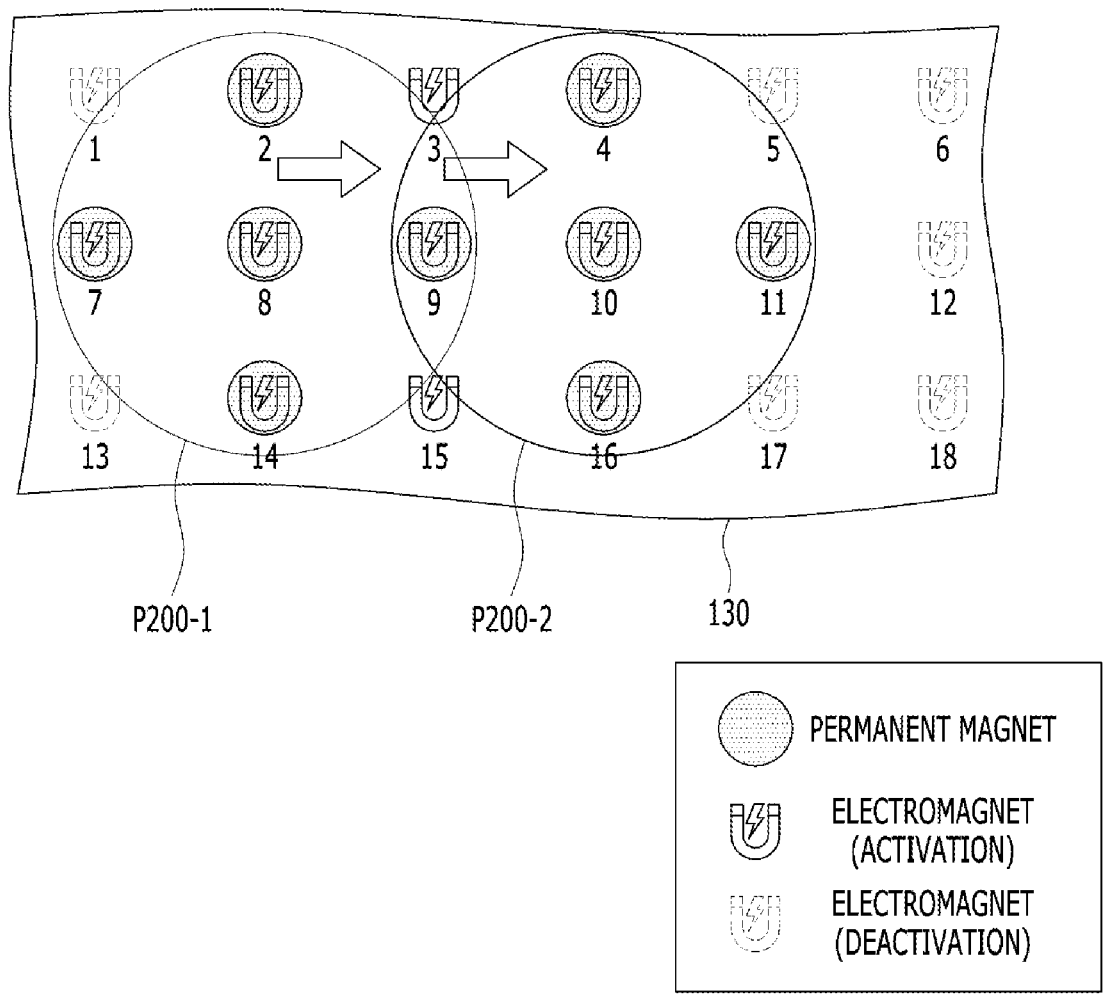
FIG. 4 is a view showing an example of the configuration of an attachment unit of an integrated operation unit according to an embodiment of the present disclosure.
Figure 5A:
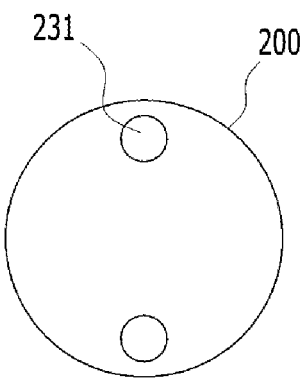
FIGS. 5A, 5B, 5C, 5D, and 5E are views showing an example of arrangement of magnetic materials for fixing a detachable knob according to an embodiment of the present disclosure.
Figure 5B:
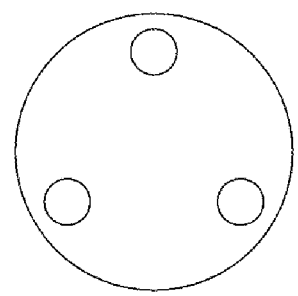
Figure 5C:
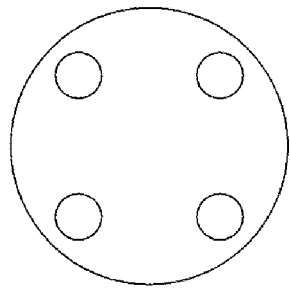
Figure 5D:
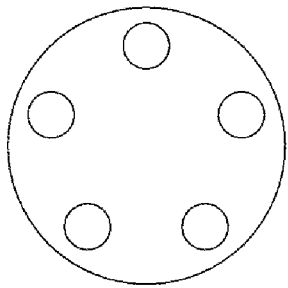
Figure 5E:
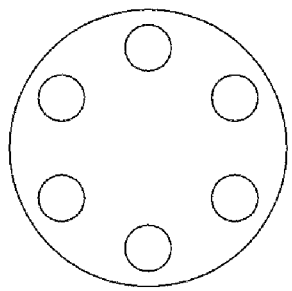

FIG. 4 is a view showing an example of the configuration of an attachment unit of an integrated operation unit according to an embodiment of the present disclosure.

Referring to FIG. 4, the attachment unit 130 of the integrated operation unit 100 may include a plurality of electromagnets 1 to 18 arranged in a grid. That is, the attachment unit 130 shown in FIG. 4 includes 18 electromagnets corresponding to 3×6 grid. However, this is an example and the attachment unit 130 according to the embodiment may include more or less electromagnets.

Here, activation and polarities of the electromagnets 1 to 18 may be determined in consideration of the arrangement pattern of the magnetic materials 231 of the detachable knob 200. For example, if the magnetic materials 231 of the detachable knob 200 are arranged in the "+" pattern as shown in FIG. 3 and are all permanent magnets having a first polarity toward the attachment unit 130, the electromagnets disposed in the attachment unit 130 of the integrated operation unit 100 have the "+" pattern as a basic activation unit, and the electromagnets included in the basic activation unit may be activated to have a second polarity opposite to the first polarity toward the lower surface of the detachable knob 200.

Specifically, electromagnets 2, 7, 8, 9 and 14 may correspond to the basic activation unit of the leftmost attachment position P200-1 of the attachment unit 130 centered on electromagnet 8. In addition, electromagnets 3, 8, 9, 10 and 15 may correspond to the basic activation unit of the second attachment position from the left, centered on electromagnet 9. In addition, electromagnets 4, 9, 10, 11 and 16 may correspond to the basic activation unit of the third attachment position P200-2 from the left, centered on electromagnet 10.

Accordingly, when the detachable knob 200 having arrangement of the magnetic materials 231 shown in FIG. 3 is attached at the leftmost attachment position P200-1 and then is moved to the third attachment position P200-2 from the left, since the magnetic materials 231 are located on the electromagnets activated with the opposite polarity at the second attachment position from the left centered on electromagnet 9, a user may feel as if the detachable knob 200 is caught once. Therefore, the user may feel movement between attachment positions through the sense of movement without viewing movement of the detachable knob.

In addition, when attachment of the detachable knob 200 is recognized at an arbitrary attachment position through an attachment recognizer and then recognition of the detachable knob 200 fails at the corresponding attachment position as described with reference to FIG. 6, the controller 260 may determine that this is movement between attachment positions of the detachable knob 200 and decrease the magnetic force of each electromagnet activated for smooth movement between attachment positions by a certain ratio.

In addition, when three types of controlled functions are currently displayed on the display 120, as shown in FIG. 4, only the basic activation units corresponding to three attachment positions are activated and the other electromagnets may be deactivated. When four types of controlled functions are displayed, electromagnets 5, 10, 11, 12 and 17 corresponding to the activation units centered on electromagnet 11 may be further activated.

In addition, the electromagnets which do not correspond to the activation units may be activated with the polarity opposite to the polarity of the activated electromagnets (that is, the same polarity as the permanent magnets of the detachable knob), instead of deactivation. For example, when electromagnets 1, 5, 13 and 17 are activated with the opposite polarity, repulsive force is generated with respect to the permanent magnets of the detachable knob 200. Accordingly, when the user attempts to move the detachable knob 200 from the leftmost attachment position P200-1 to the left, the user may easily recognize that movement is attempted in an incorrect direction by repulsive force. In some embodiments, the electromagnets (e.g., electromagnets 1, 6, 13 and 18) located at the outermost edge may be always activated with the polarity opposite to the polarity of the electromagnets corresponding to the activation units, regardless of the number of functions displayed on the display 120 or the activation units.

Meanwhile, the magnitude of the magnetic force generated between the magnetic materials 231 of the detachable knob 200 and the electromagnets provided in the attachment unit 130 of the integrated operation unit 100 may be greater than rotation resistance of the dial 210 while detachment does not occur by vibration generally occurring in traveling of the vehicle when the detachable knob 200 is attached at an arbitrary attachment position, in order to prevent a phenomenon wherein the detachable knob 200 rotates without moving the dial from the viewpoint of the detachable knob 200 in the case where magnetic force is less than rotation resistance when the user rotates the dial 210.

Of course, it is apparent to those skilled in the art that the magnitude of the magnetic force may vary according to the weight of the detachable knob 200, an angle between the attachment position of the detachable knob 200 in the vehicle and a vertical direction and the rotation resistance of the dial 210.

The arrangement patterns of the magnetic materials 231 shown in FIGS. 3 and 4 are examples and the arrangement patterns of the magnetic materials may be variously changed. This will be described with reference to FIGS. 5A to 5E.

FIGS. 5A to 5E are views showing an example of arrangement of magnetic materials for fixing a detachable knob according to an embodiment of the present disclosure.

In FIGS. 5A to 5E, a large circle 200 corresponds to the planar shape of the detachable knob 200 and indicates the attachment position of the detachable knob 200, and small circles 231 indicate positions where electromagnets are disposed.

For example, all the small circles 231 may be permanent magnets or electromagnets or some of the small circles may be permanent magnets and the other small circles may be electromagnets.

Two or more magnetic materials 231 may be provided such that the detachable knob 200 does not rotate by operation of the dial 210 after the detachable knob 200 is attached. In addition, the magnetic materials 231 may be symmetrically disposed with respect to the center of the attachment position. Therefore, the detachable knob 200 is easily attached at an accurate position, only by disposing the detachable knob 200 to be close to the attachment position. Of course, the positions and number of electromagnets within the attachment position in the attachment unit 130 of the integrated operation unit 100 may be variously changed to correspond to the pattern of the magnetic materials 231 of the detachable knob 200.

Figure 6C:
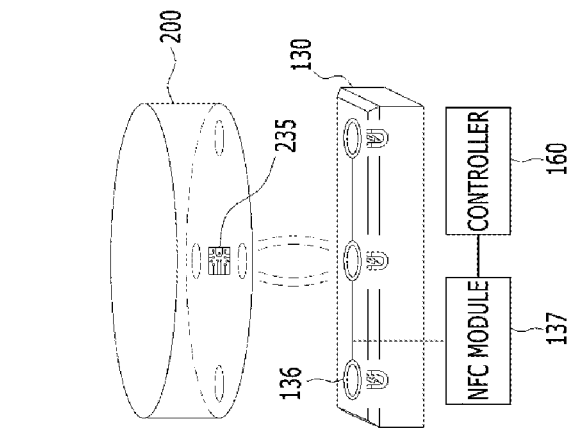
FIGS. 6A, 6B, and 6C are views illustrating a recognizer for recognizing whether a detachable knob according to an embodiment of the present disclosure is attached.
Figure 6B:
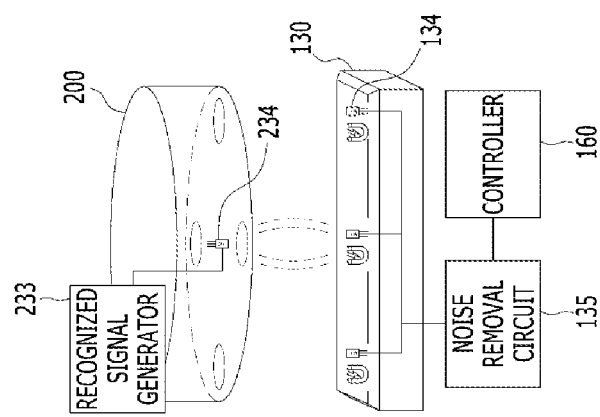
Figure 6A:
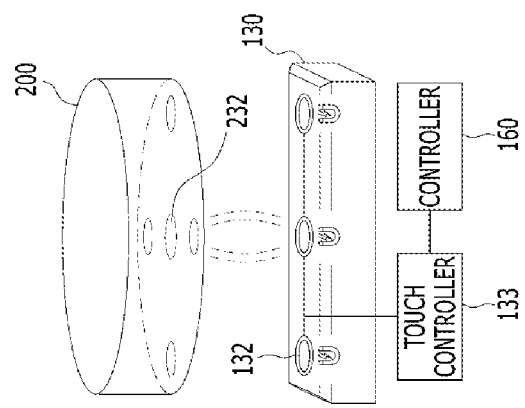

Next, the method of recognizing whether the detachable knob 200 is attached at the attachment unit 130 of the integrated operation unit 100 will be described with reference to FIGS. 6A to 6C. FIGS. 6A to 6C are views illustrating a recognizer for recognizing whether a detachable knob according to an embodiment of the present disclosure is attached. In FIGS. 6A to 6C, for convenience, assume that the number of attachment positions in the attachment unit 130 of the integrated operation unit 100 is three, the attachment unit 130 of the integrated operation unit 100 has a recognizer, and the attachment unit 230 of the detachable knob 200 has a recognized portion.

First, referring to FIG. 6A, a conductor 232 is disposed at the center of the lower surface of the detachable knob 200, and a capacitance sensor 132 for sensing capacitance change according to proximity of the conductor 232 may be provided in the attachment unit 130 of the integrated operation unit 100 for each attachment position. A touch controller 133 may inform the controller 160 of an attachment position where the sensing value of the capacitance sensor 132 corresponding to the attachment position of the detachable knob 200 is changed among the plurality of capacitance sensors 132.

Next, referring to FIG. 6B, a light emitting element 234 for emitting light in a specific pattern under control of a recognized signal generator 233 may be disposed at the center of the lower surface of the detachable knob 200 and a light reception element 134 for recognizing the light emission pattern of the light emitting element 234 may be provided in the attachment unit 130 of the integrated operation unit 100 for each attachment position. A noise removal circuit 135 may remove noise of the light reception element 134 and inform the controller 160 of a light reception element 134, which has detected a specific light emission pattern, such that the controller 160 may determine the attachment position of the detachable knob 200.

In addition, referring to FIG. 6C, an NFC tag may be disposed at the center of the lower surface of the detachable knob 200 and an NFC antenna 136 may be provided in the attachment unit 130 of the integrated operation unit 100 for each attachment position. The NFC module 137 may inform the controller 160 of the position of the antenna 136 detected by the NFC tag, such that the controller 160 may determine the attachment position of the detachable knob 200.

Although not shown, a Hall sensor is provided for each attachment position to detect the magnetic material 231 of the detachable knob 200, thereby determining the attachment position of the detachable knob 200.

Next, the configuration of the power supply 270 of the detachable knob 200 will be described with reference to FIGS. 7A and 7B. FIGS. 7A and 7B are views showing an example of the configuration of a power supply of a detachable knob according to an embodiment of the present disclosure.

Referring to FIG. 7A, each component of the detachable knob 200 including the controller 260 may receive power from a replaceable battery 271.

In contrast, as shown in FIG. 7B, when a wireless charging receiver 273 is provided at the center of the lower surface of the detachable knob 200 and wireless charging transmitters 131A, 131B and 131*c* are disposed in the attachment unit 130 of the integrated operation unit 100 for each attachment position, the detachable knob 200 may receive power using a wireless charging method. In such a configuration, the integrated operation unit 100 may determine the attachment position of the detachable knob 200 based on the position of the activated wireless charging transmitter.

Hereinafter, the appearance of the attachment unit 130 of the integrated operation unit 100 will be described with reference to FIGS. 8 to 10C.

Figure 8:
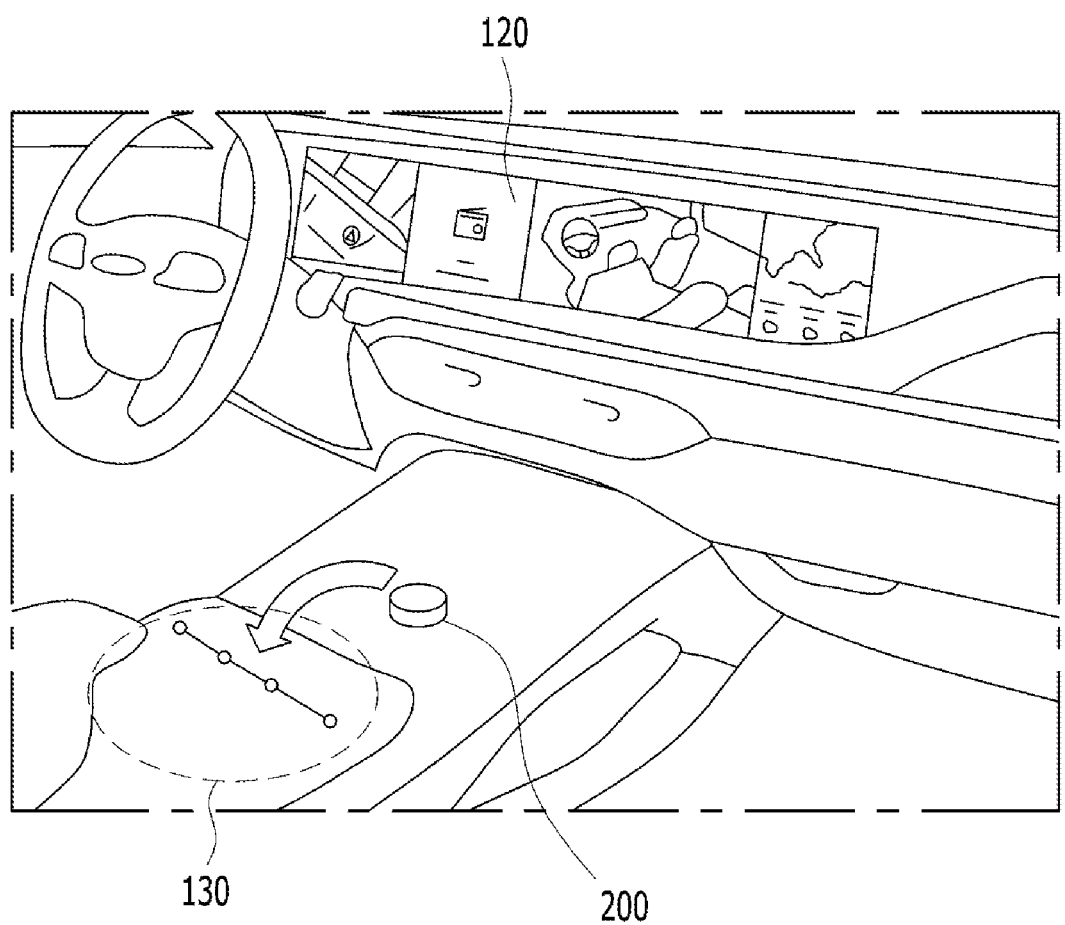
FIG. 8 is a view showing an example of the appearance of an attachment unit of an integrated operation unit according to an embodiment of the present disclosure.
Figure 9A:
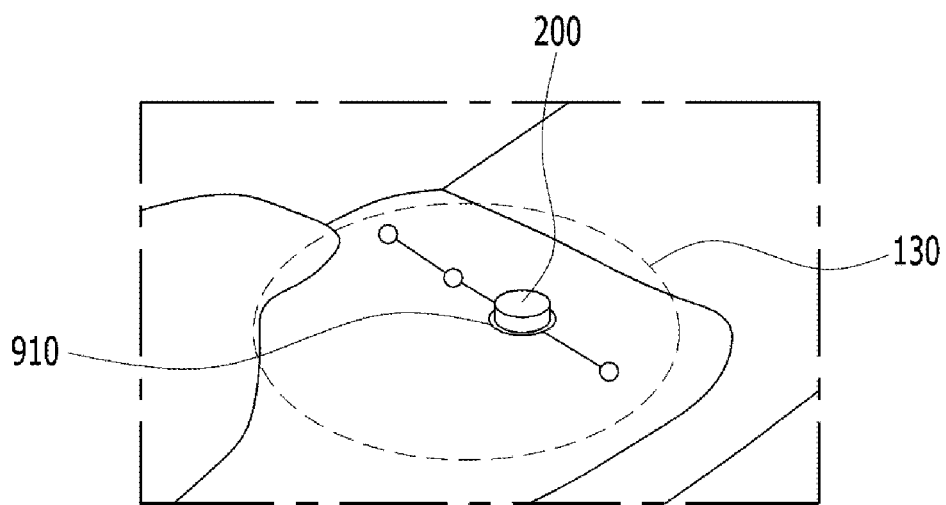
FIGS. 9A and 9B are views showing an example in which a detachable knob is attached at any one of the attachment positions shown in FIG. 8.
Figure 9B:
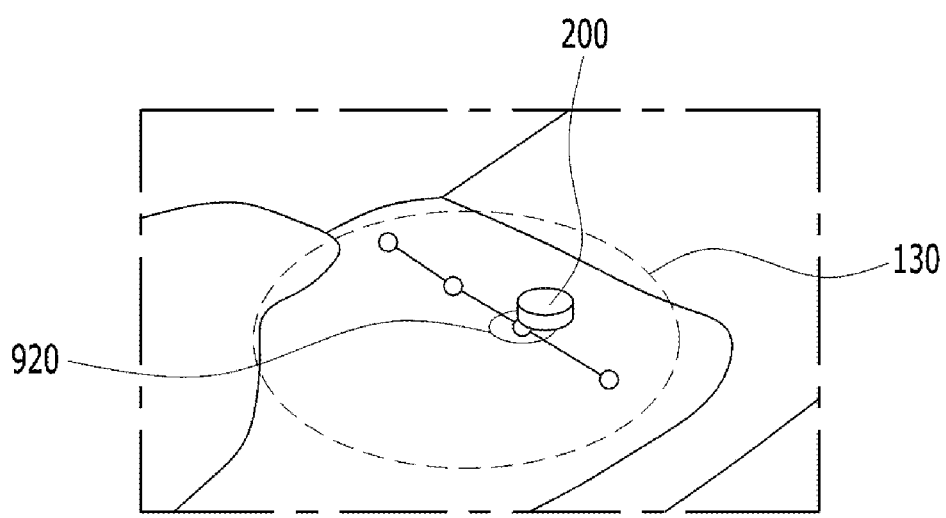

FIG. 8 is a view showing an example of the appearance of an attachment unit of an integrated operation unit according to an embodiment of the present disclosure, and FIGS. 9A and 9B are views showing an example in which a detachable knob is attached at any one of the attachment positions shown in FIG. 8. In FIGS. 8 to 9B, assume that a total of four attachment positions are provided in the attachment unit 130 of the integrated operation unit 100.

Referring to FIG. 8, when a display 120 extending from a cluster to a center fascia region in a horizontal direction is applied to a vehicle, the attachment unit 130 of the integrated operation unit 100 is provided in a center console region and attachment positions are arranged in parallel in the horizontal direction. At this time, a point light source may be disposed at each attachment position to be intuitively recognized by a driver, and a linear light source may be disposed between point light sources. Accordingly, the driver may attach the detachable knob 200 to any one of the point light sources.

As shown in FIG. 9A, when the detachable knob 200 is attached at the third attachment position from the left, at least one of the light emission range or light emission intensity of the point light source at the corresponding position is controlled, thereby applying a ring-shaped light emission effect 910 around the lower surface of the attached detachable knob 200.

If the detachable knob 200 deviates from an accurate attachment position, for example, when the signal sensitivity of the attachment recognizer described with reference to FIGS. 6A to 6C is equal to or less than a certain level, the point light source corresponding to the corresponding attachment position may output light emission effect 920 different from FIG. 9B in terms of at least one of color or shape, thereby notifying the driver that the detachable knob deviates from the attachment position.

Meanwhile, although the case where the plurality of attachment positions is aligned in parallel in the horizontal direction is described in FIGS. 8 to 9B, alignment of the plurality of attachment positions may vary according to the display 120. This will be described with reference to FIGS. 10A to 10C.

Figure 10A:
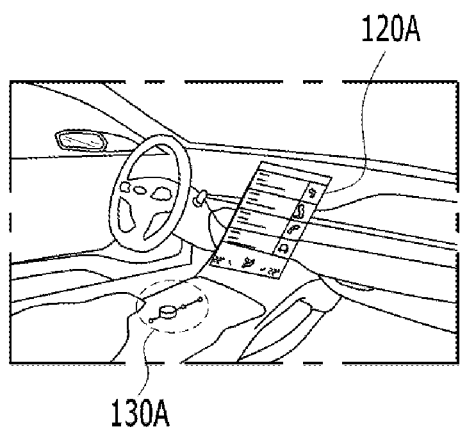
FIGS. 10A, 10B, and 10C are views showing alignment forms of attachment positions according to the shape of a display according to an embodiment of the present disclosure.
Figure 10B:
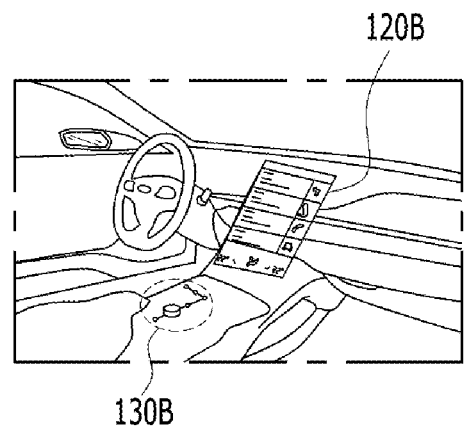
Figure 10C:
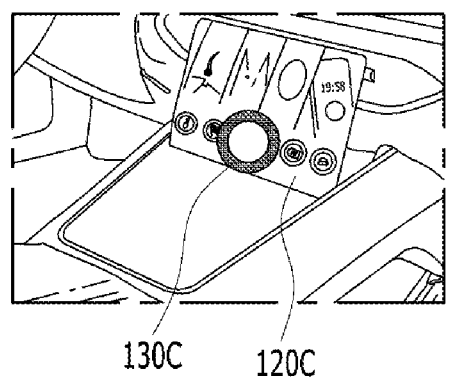

FIGS. 10A to 10C are views showing alignment forms of attachment positions according to the shape of a display according to an embodiment of the present disclosure.

First, referring to FIG. 10A, in a vehicle, to which a rectangular display 120A having a long axis in a vertical direction is applied, the attachment positions of the attachment unit 130A may be aligned in parallel in the vertical direction.

In contrast, if a bent linear display, for example, an "L-shaped" display 120B is applied as shown in FIG. 10B, the attachment positions of the attachment unit 130B may be aligned along the bent line in correspondence with the shape of the display 120B.

In addition, as shown in FIG. 10C, if a display 120C of the integrated operation unit 100 is provided on the lower end of the center fascia, attachment positions may be provided in the lower central region 130C of the display 120C. At this time, a predetermined display object (e.g., a circular object corresponding to the actual size of the detachable knob displayed at the attachment position) may be displayed in the lower central region 130C to correspond to the attachment position such that the user visually recognizes the attachment position.

Although not shown, it is apparent to those skilled in the art that the attachment positions may be provided on a steering wheel or at the center of the center fascia, that is, may be variously changed.

Hereinafter, the interworking function of the detachable knob and the integrated operation unit will be described with reference to FIGS. 11A to 11C, based on the configuration of the apparatus.

Figure 11A:
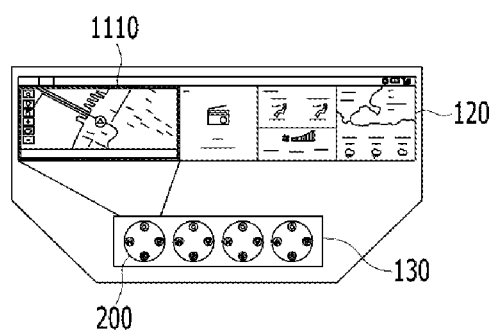
FIGS. 11A, 11B, and 11C are views showing an example of performing an interworking function of a detachable knob and the display of an integrated operation unit according to an embodiment of the present disclosure.
Figure 11B:
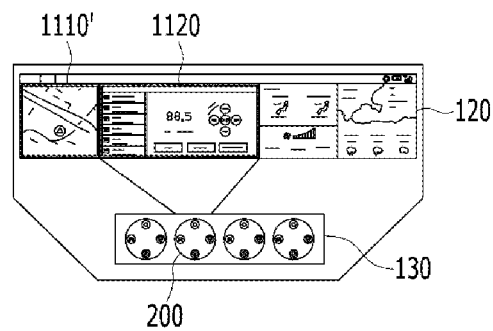
Figure 11C:
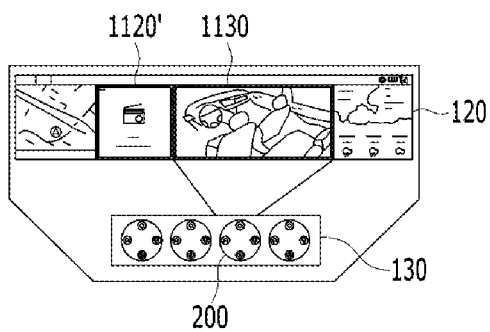

FIGS. 11A to 11C are views showing an example of performing an interworking function of a detachable knob and the display of an integrated operation unit according to an embodiment of the present disclosure.

In FIGS. 11A to 11C, assume that four controlled functions are simultaneously displayed on the display 120 and navigation, multimedia player, air conditioning control and weather information are sequentially displayed from the left. In addition, assume that, in the attachment unit 130 of the integrated operation unit 100, four attachment positions are aligned in parallel in the horizontal direction.

First, referring to FIG. 11A, as the detachable knob 200 is attached at the leftmost attachment position of the attachment unit 130, a region 1110 in which the navigation function is displayed may be enlarged and displayed on the display 120 in the horizontal direction. In this state, when the dial 210 or the operation unit 220 of the detachable knob 200 is operated, the navigation function may be controlled.

For example, in the configuration of the operation unit 220A shown in FIG. 2A, four buttons may perform hot key functions for a current position, a destination search function, a point of interest (POI), and a view change function clockwise from an upper end thereof.

In this state, as shown in FIG. 11B, when the detachable knob 200 is moved to the second attachment position from the left, the region 1110', in which the navigation function is displayed, of the display 120 may be reduced and a region 1120 in which the multimedia player function is displayed may be enlarged. In this state, when the dial 210 or the operation unit 220 of the detachable knob 200 is operated, the multimedia player function may be controlled.

For example, in the operation unit 220A shown in FIG. 2A, buttons may perform hot key functions for search, a track, a menu and a media source change function clockwise from an upper end thereof.

In this state, as shown in FIG. 11C, when the detachable knob 200 is moved to the third attachment position from the left, the region 1120' in which the multimedia player function is displayed of the display 120 may be reduced and a region 1130 in which the air conditioning function is displayed may be enlarged. In this state, when the dial 210 or the operation unit 220 of the detachable knob 200 is operated, the air conditioning function may be controlled. The interworking function shown in FIG. 11 will be described with reference to FIG. 12.

Figure 12:
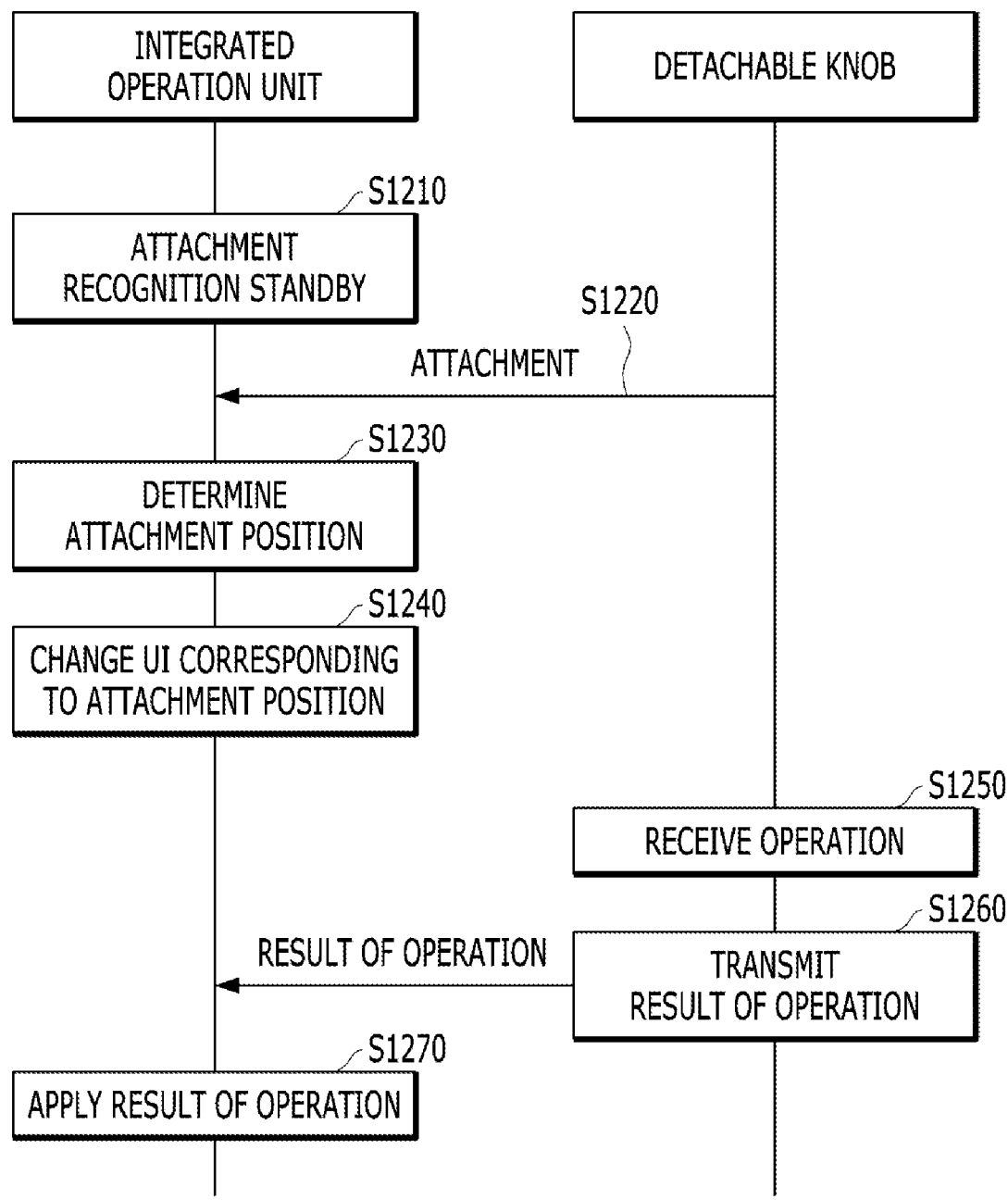
FIG. 12 is a flowchart illustrating an example of a process of operating an in-vehicle function control system including a detachable knob according to an embodiment of the present disclosure.

FIG. 12 is a flowchart illustrating an example of a process of operating an in-vehicle function control system including a detachable knob according to an embodiment of the present disclosure.

Referring to FIG. 12, the integrated operation unit 100 is in an attachment recognition standby state and may monitor whether the detachable knob is attached (S1210). This state may be achieved in a state in which the detachable knob 200 is attached in any attachment region and then is detached, activation may be performed in a specific power state (e.g., ACC), and activation may be performed when a smart key is detected in the vehicle, without being limited thereto. In addition, in this step, power may start to be applied to the electromagnets of the attachment unit 130, and the other detection units, for example, the touch controller 133, the light reception element 134, the noise removal circuit 135, and the NFC module 137 may be activated.

As the detachable knob 200 is attached at any one of the attachment positions on the attachment unit 130 (S1220), the integrated operation unit 100 may detect the attachment position through the attachment unit 130 along with information indicating whether the detachable knob 200 is attached (S1230).

The integrated operation unit 100 may change at least a portion of a user interface configuration displayed on the display 120 described with reference to FIG. 11 according to the attachment position (S1240).

Thereafter, when user operation such as operation of the dial 210 or touch input or push command input on the operation unit 220 is received (S1250), the detachable knob 200 may transmit information on the operation (e.g., an operated object, an operation amount, an operation direction, etc.) to the integrated operation unit 100 through the wireless communication unit 250 (S1260).

The integrated operation unit 100 may apply the result of operation to the controlled function based on the information on the operation received through the wireless communication unit 150 (S1270).

Meanwhile, although the detachable knob 200 is described as interworking with the display 120 of the integrated operation unit 100 in the above-described embodiment, the present disclosure is not limited thereto and the detachable knob may be attached around a touch panel without a display function to configure an operation system of a vehicle along with the touch panel.

The vehicle control method using the detachable knob according to the above-described embodiments of the present disclosure may have the following effects.

First, it is possible to increase the degree of freedom in the design of the detachable knob and the in-vehicle operation system and to enhance intuitive usability, by switch reduction. For example, the physical key button may be simplified due to the detachable knob. In another example, the center fascia and the floor console switch may be integrated due to function integration.

In addition, since the detachable knob is attached/detached using magnetic force, usability thereof increases. That is, since magnetic force is used instead of a mechanical structure for fixing the detachable knob in an attachment region, it is possible to conveniently attach the detachable knob by providing the detachable knob to be close to the attachment region.

In addition, it is unnecessary to visually check a degree of operation without keeping eyes forward while the vehicle travels, due to the sense of operation of the physical dial.

The in-vehicle function control apparatus according to at least one embodiment of the present disclosure can provide a more convenient user interface by interworking with a detachable knob.

In addition, according to the present disclosure, it is possible to conveniently change the controlled function and the user interface according to the attachment position of the detachable knob.

The effects of the present disclosure are not limited to the above-described effects and other effects which are not described herein may be derived by those skilled in the art from the above description of the embodiments of the present disclosure.

The disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of controlling a vehicle function using a detachable knob, the method comprising:
    an integrated operation unit detecting an attachment position of the detachable knob among a plurality of attachment positions in a vehicle;
    when an operation unit provided in the detachable knob is operated, transmitting information on a result of the operation from the detachable knob to the integrated operation unit; and
    the integrated operation unit controlling a controlled function corresponding to the attachment position of the detachable knob based on the information on the result,
    wherein the detachable knob is fixed at any one of the plurality of attachment positions using magnetic force;
    wherein the integrated operation unit includes a display having a plurality of display regions respectively corresponding to a plurality of controlled functions;
    wherein the plurality of attachment positions have an alignment form corresponding to a shape of the display; and
    wherein the plurality of attachment positions are spaced apart from the display.

2. The method according to claim 1, further comprising the integrated operation unit enlarging a display region, in which a controlled function corresponding to the detected attachment position is displayed, among the plurality of display regions.

3. The method according to claim 1, wherein a light emission unit for emitting light in a first pattern is disposed in each of the plurality of attachment positions,
    wherein the method further includes:
    a light emitting unit corresponding to the detected attachment position emitting light in a second pattern; and
    a light emitting unit corresponding to the detected attachment position emitting light in a third pattern when deviation of the detachable knob from the detected attachment position is detected.

4. The method according to claim 1,
    wherein the detachable knob has a cylindrical appearance, and
    wherein the operation unit includes at least one of a key button disposed on an upper surface of the detachable knob, a touch pad or a ring-shaped dial surrounding the upper surface.

5. The method according to claim 1,
    wherein the detachable knob includes a plurality of magnetic materials arranged in a specific pattern, and
    wherein the integrated operation unit includes a plurality of electromagnets disposed in a grid at the plurality of arrangement positions.

6. The method according to claim 5, wherein activation of the plurality of electromagnets is determined in a basic activation unit corresponding to the specific pattern.

7. The method according to claim 6,
wherein the plurality of magnetic materials has a first polarity,
wherein electromagnets activated in the basic activation unit among the plurality of electromagnets are activated with a second polarity opposite to the first polarity, and
wherein electromagnets corresponding to outer edges in the grid are activated with the first polarity.

8. A computer-readable recording medium having recorded thereon a program for executing the method according to claim 1.

9. An in-vehicle function control apparatus using a detachable knob, the in-vehicle function control apparatus comprising:
the detachable knob including an operation unit; and
an integrated operation unit configured to detect an attachment position of the detachable knob among a plurality of attachment positions in a vehicle,
wherein, when the operation unit is operated, the detachable knob transmits information on a result of the operation to the integrated operation unit,
wherein the integrated operation unit controls a controlled function corresponding to the attachment position of the detachable knob based on the information on the result,
wherein the detachable knob is fixed at any one of the plurality of attachment positions using magnetic force;
wherein the integrated operation unit includes a display having a plurality of display regions respectively corresponding to a plurality of controlled functions;
wherein the plurality of attachment positions has an alignment form corresponding to a shape of the display; and
wherein the plurality of attachment positions are spaced apart from the display.

10. The in-vehicle function control apparatus according to claim 9, wherein the integrated operation unit enlarges a display region in which a controlled function corresponding to the detected attachment position is displayed among the plurality of display regions.

11. The in-vehicle function control apparatus according to claim 9, wherein a light emission unit for emitting light in a first pattern is disposed in each of the plurality of attachment positions,
wherein a light emitting unit corresponding to the detected attachment position emits light in a second pattern; and
wherein, when deviation of the detachable knob from the detected attachment position is detected, a light emitting unit corresponding to the detected attachment position emits light in a third pattern.

12. The in-vehicle function control apparatus according to claim 9,
wherein the detachable knob has a cylindrical appearance, and
wherein the operation unit includes at least one of a key button disposed on an upper surface of the detachable knob, a touch pad or a ring-shaped dial surrounding the upper surface.

13. The in-vehicle function control apparatus according to claim 9,
wherein the detachable knob includes a plurality of magnetic materials arranged in a specific pattern, and
wherein the integrated operation unit includes a plurality of electromagnets disposed in a grid at the plurality of arrangement positions.

14. The in-vehicle function control apparatus according to claim 13, wherein activation of the plurality of electromagnets is determined in a basic activation unit corresponding to the specific pattern.

15. The in-vehicle function control apparatus according to claim 14,
wherein the plurality of magnetic materials has a first polarity,
wherein electromagnets activated in the basic activation unit among the plurality of electromagnets are activated with a second polarity opposite to the first polarity, and
wherein electromagnets corresponding to outer edges in the grid are activated with the first polarity.

* * * * *